United States Patent [19]

Akagi

[11] Patent Number: 5,023,152

[45] Date of Patent: Jun. 11, 1991

[54] FUEL CELL ASSEMBLY

[75] Inventor: Kousuke Akagi, Osaka, Japan

[73] Assignee: Osaka Gas Co., Ltd., Osaka, Japan

[21] Appl. No.: 483,942

[22] Filed: Feb. 22, 1990

[30] Foreign Application Priority Data

Jun. 16, 1989 [JP] Japan .................................. 1-155517

[51] Int. Cl.⁵ .......................................... H01M 8/12
[52] U.S. Cl. ........................................ 429/32; 429/38; 429/39
[58] Field of Search ...................... 429/38, 39, 30, 31, 429/32, 33

[56] References Cited

U.S. PATENT DOCUMENTS

| | | | |
|---|---|---|---|
| 3,188,242 | 6/1965 | Kordesch et al. | 429/38 |
| 4,499,663 | 2/1985 | Zwick et al. | 429/32 |
| 4,640,875 | 2/1987 | Makiel | 429/39 |
| 4,766,043 | 8/1988 | Shirogami | 429/39 |

Primary Examiner—Donald L. Walton

Attorney, Agent, or Firm—Gifford, Groh, Sprinkle, Patmore and Anderson

[57] ABSTRACT

In a fuel cell assembly, each cell is disposed inside a fuel flow passage or an oxygen-containing gas flow passage. A lower end portion of the cell is inserted into a recess defined in a partition wall sectioning between the fuel flow passage or a fuel feed passage and the oxygen-containing gas feed passage, while an upper end portion of the cell is insertible into and withdrawable from a further partition wall sectioning between the fuel flow passage or the oxygen-containing gas passage and an exhaust passage. In a further fuel cell assembly also disclosed, each cell is disposed inside a fuel flow passage or an oxygen-containing gas flow passage. One side end of the cell is airtightly connected with a partition wall sectioning between the fuel flow passage and the oxygen-containing gas feed passage or between the fuel feed passage and the oxygen-containing gas flow passage, while the other side end of the cell is insertible into and withdrawable from a further partition wall sectioning between the fuel flow passage or the oxygen-containing gas flow passage and the exhaust passage.

20 Claims, 10 Drawing Sheets

FUEL CELL ASSEMBLY

BACKGROUND OF THE INVENTION

1. Field of the Invention

The present invention relates to a fuel cell assembly, and more particularly a fuel cell assembly including a cell having a solid electrolytic layer, an oxygen electrode attached to one side of the electrolytic layer and opposed to an oxygen-containing gas flow passage, and a fuel electrode attached to the other side of the electrolytic layer and opposed to a fuel flow passage.

2. Description of the Related Art

In a conventional fuel cell assembly illustrated in FIG. 17, a cell C has a film or plate type oxygen electrode 2 attached to one side of a plate type solid electrolytic layer 1 and a film or plate type fuel electrode 3 attached to the other side of the electrolytic layer 1, and this cell C is attached with a separator 42 for forming an oxygen-containing gas flow passage 41 with the oxygen electrode 2 therebetween and with a further separator 42 for forming a fuel flow passage 43 with the fuel electrode 3 therebetween.

Then, as illustrated in FIG. 18, a first air feed passage 45 communicating with one of the fuel flow passage 43 and the oxygen-containing gas flow passage 41 and a second air feed passage 46 communicating with the other of the passage 43 and the passage 41 are sectioned from each other via a first partition wall 47. Further, an exhaust passage 48 communicating with the second air feed passage 46 and the first air feed passage 45 are sectioned from each other via a second partition wall 49. And, the cell C is disposed between the first partition wall 47 and the second partition wall 49 and connected with the respective walls 47 and 49 in an airtight manner.

With the above-described conventional construction, many elements such as the cell C and the separators 42 must be assembled one after another to form one integrally assembled construction. Such assembly is more troublesome than separate assembly of one cell and a pair of separators in one combination.

Moreover, since the cell C is subjected to a high temperature as high as 600 to 1,000 degrees in Celsius due to the thermal energy associated with electricity generation, tends to occur thermal expansion in the cell C which force is mostly applied to airtight connecting portions 50 connecting between the cell C and each of the opposed partition walls 47, 49. As a result, tends to occur breakage in the airtight connecting portions 50, cell C, and the partiton walls 47 and 49.

With view to the above-described problems of the prior art, the primary object of the present invention is to provide an improved fuel cell assembly which construction is simple and inexpensive to manufacture and is free from breakage due to thermal strain.

SUMMARY OF THE INVENTION

In order to accomplish the above-noted object, a fuel cell assembly relating to the present invention comprises: a cell consisting essentially of a solid electrolytic layer, an oxygen electrode attached to one side of the electrolytic layer and opposed to an oxygen-containing gas flow passage and of a fuel electrode attached to the other side of the electrolytic layer and opposed to a fuel flow passage; a separator attached to only one of the oxygen electrode and the fuel electrode and for forming therewith and therebetween the oxygen-containing gas flow passage or the fuel flow passage; an oxygen-containing gas feed passage or a fuel feed passage communicating with either the oxygen-containing gas flow passage or the fuel flow passage and disposed downwardly of the fuel flow passage or the oxygen-containing gas flow passage; and an exhaust passage communicating with either the oxygen-containing gas flow passage or the fuel flow passage and disposed upwardly of the fuel flow passage or the oxygen-containing gas flow passage; wherein the cell is disposed inside the fuel flow passage or the oxygen-containing gas flow passage; a lower end portion of the cell being inserted into a recess defined in a partition wall sectioning between the fuel flow passage and the oxygen-containing gas flow passage or between the fuel feed passage and the oxygen-containing gas feed passage; and an upper end portion of the cell being insertible into and withdrawable from a further partition wall sectioning between the fuel flow passage or the oxygen-containing gas flow passage and the exhaust passage.

Functions and effects of the above-described construction will be described next.

In the above construction, one separator is attached to the cell, and only one of the oxygen-containing gas flow passage and the fuel flow passage is sectioned by means of the cell and the separator. Further, the cell is disposed inside the fuel flow passage or the oxygen-containing gas flow passage such that oxygen-containing gas and fuel can be fed respectively to the oxygen electrode and the fuel electrode of the cell. Accordingly, each cell can be manufactured independently and the manufacture of the entire fuel cell assembly can be carried out easily and inexpensively.

Moreover, the cell is disposed with a vertical orientation such that its lower end portion is inserted into the recess defined in the partition wall disposed downwardly of the cell. As a result, the weight of the cell per se provides sufficient airtightness between the cell and the partition wall disposed downwardly. Further, the upper end portion of the vertically positioned cell is insertible into and also withdrawable from the further partition wall disposed upwardly of the cell. This arrangement not only provides sufficient sealing effect for the gap between the fuel flow passage and the oxygen-containing gas feed passage or the gap between the fuel feed passage and the oxygen-containing gas flow passage against gas or fuel leakage therethrough, but also serves to absorb thermal expansion of the cell subjected to high temperature thereby to prevent breakage of the cell assembly due to concentration of stress associated with the thermal strain.

According to one preferred embodiment of the present invention, a fuel cell assembly comprises: a cell consisting essentially of a solid electrolytic layer, an oxygen electrode attached to one side of the electrolytic layer and opposed to an oxygen-containing gas flow passage and of a fuel electrode attached to the other side of the electrolytic layer and opposed to a fuel flow passage; a separator attached to only one of the oxygen electrode and the fuel electrode and for forming therewith and therebetween the oxygen-containing gas flow passage or the fuel flow passage; an oxygen-containing gas feed passage or a fuel feed passage communicating with either the oxygen-containing gas flow passage or the fuel flow passage and disposed at one lateral side of the fuel flow passage; and an exhaust passage communicating with either the oxygen-containing gas flow passage or the fuel flow passage and disposed at the other lateral side of the fuel flow passage; wherein the cell is disposed inside the fuel flow passage or the oxygen-containing gas flow passage; one side end of the cell being airtightly connected with a partition wall sectioning between the fuel flow passage and the oxygen-containing gas feed passage or between the fuel feed passage and the oxygen-containing gas flow passage; and the other side end of the cell being insertible into and withdrawable from a further partition wall sectioning between the fuel flow passage or the oxygen-containing gas flow passage and the exhaust passage.

Functions and effects of the above construction will be described next.

With this construction, similarly to the foregoing construction, each cell can be manufactured independently and the manufacture of the entire fuel cell assembly can be carried out easily and inexpensively.

Moreover, the cell is disposed with a lateral orientation such that its one side end portion is airtightly connected with the partition wall for sectioning between the fuel flow passage and the oxygen-containing gas feed passage or between the fuel feed passage and the oxygen-containing gas flow passage. And, the other side end portion of the cell is insertible into and also withdrawable from the further partition wall. As a result, the construction achieves good sealing effect against inadvertent mixture of the fuel and the oxygen-containing gas and achieves also significant reduction in the concentration of stress on the cell, the partition walls and on the airtight connecting portions resulting from the thermal expansion of the cell which is subjected to high temperature.

More specifically, since the cell has only its one side end fixed to the partition wall, the invention's construction is much more absorbent for thermal expansion of the cell than the conventional construction where both side ends of the cell are fixed. Accordingly, with the invention's construction, it has become possible to effectively avoid breakage of the cell, the partition walls and the airtight connecting portions therebetween resulting from stress concentration of thermal strain.

Consequently, the invention has fully achieved its intended object of providing an improved fuel cell assembly which construction is easy and inexpensive to manufacture and is free from breakage due to thermal strain.

BRIEF DESCRIPTION OF THE DRAWINGS

FIGS. 1 through 4 illustrate a first embodiment of the present invention relating to a fuel cell assembly; in which, FIG. 1 is a section view, FIG. 2 is a partially sectional view taken along a line II—II of FIG. 1, FIG. 3 is a partial sectional view taken along a line III—III of FIG. 1, and FIG. 4 is an exploded prespective view of the fuel cell assembly, FIGS. 5 through 8 illustrate a second embodiment of the present invention relating to a further fuel cell assembly; in which, FIG. 5 is a section view, FIG. 6 is a partially sectional view taken along a line VI—VI of FIG. 5, FIG. 7 is a partially sectional view taken along a line VII—VII of FIG. 5, and FIG. 8 is an exploded perspective view of the further fuel cell assembly;

FIGS. 9 through 11 illustrate a third embodiment of the present invention relating to a still further fuel cell assembly; in which, FIG. 9 is a section view, FIG. 10 is a partially sectional view taken along a line X—X of FIG. 9, FIG. 11 is a partially sectional view taken along a line XI—XI of FIG. 9, and FIGS. 12 through 14 illustrate a fourth embodiment of the present invention relating to a still further fuel cell assembly; in which, FIGS. 17 and 18 illustrate a fuel cell assembly relating to the prior art; in which, FIG. 17 is an exploded perspective view of the cell assembly, and FIG. 18 is a section view of the same.

DESCRIPTION OF THE PREFERRED EMBODIMENTS

Figure 1:
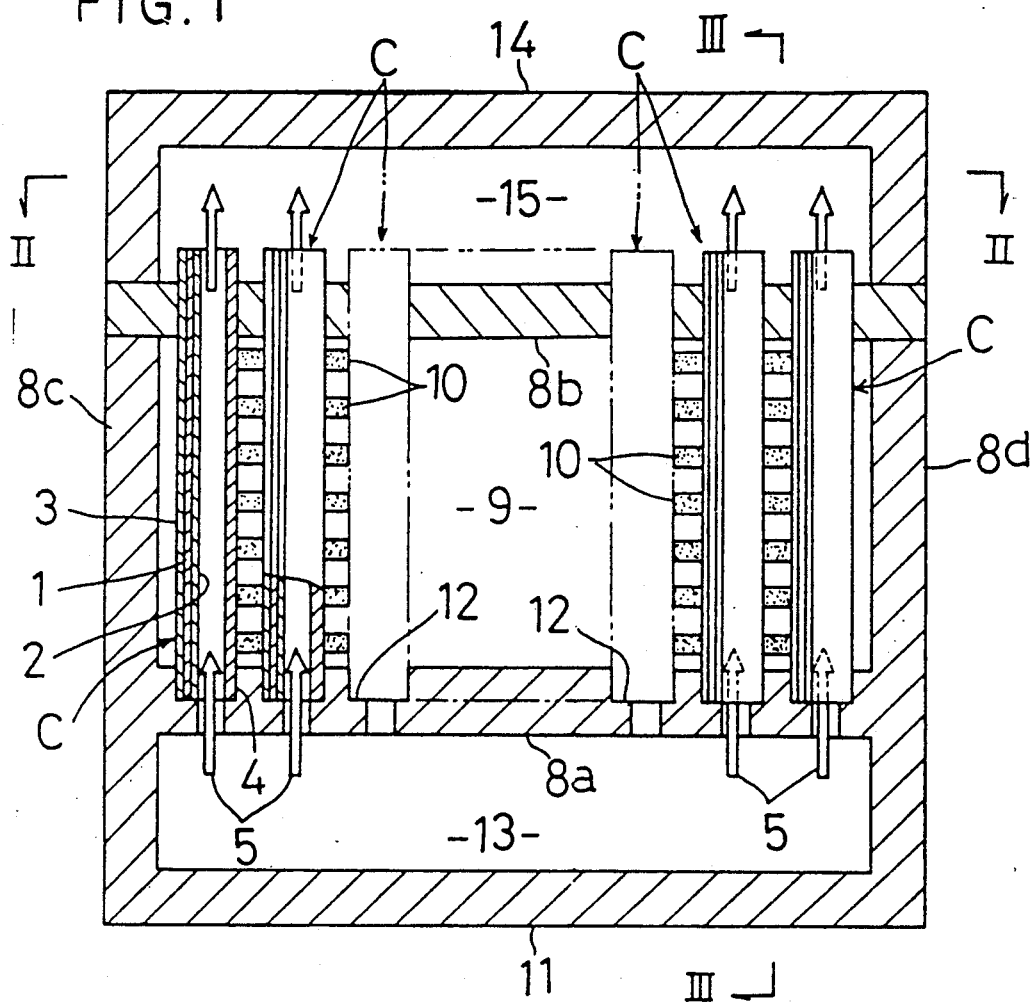
Figure 2:
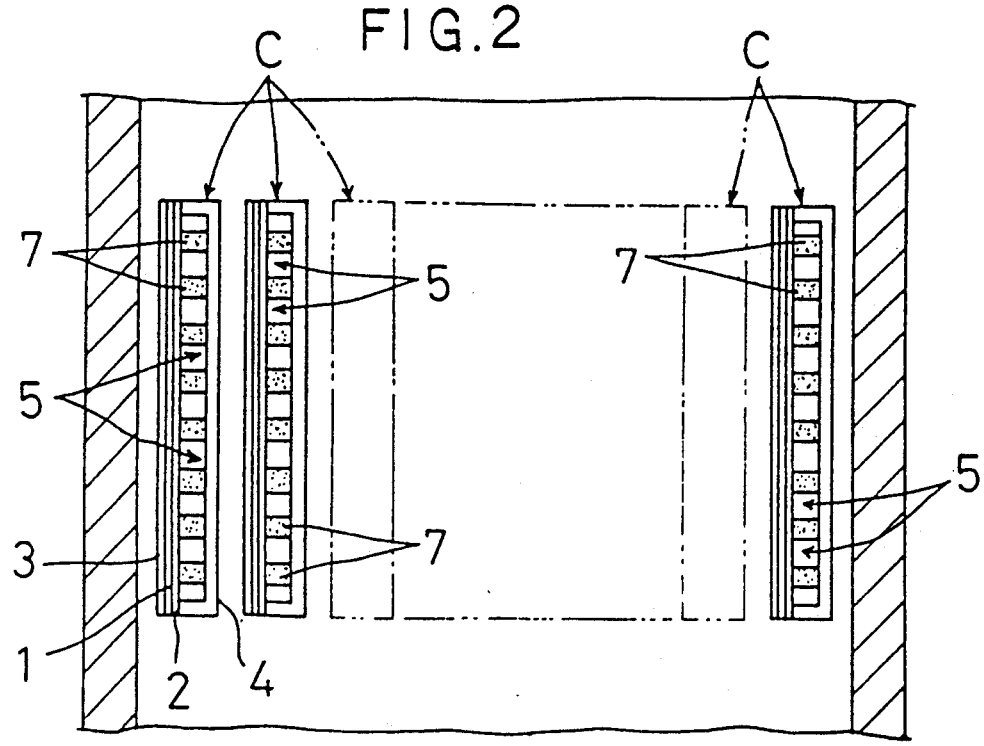
Figure 3:
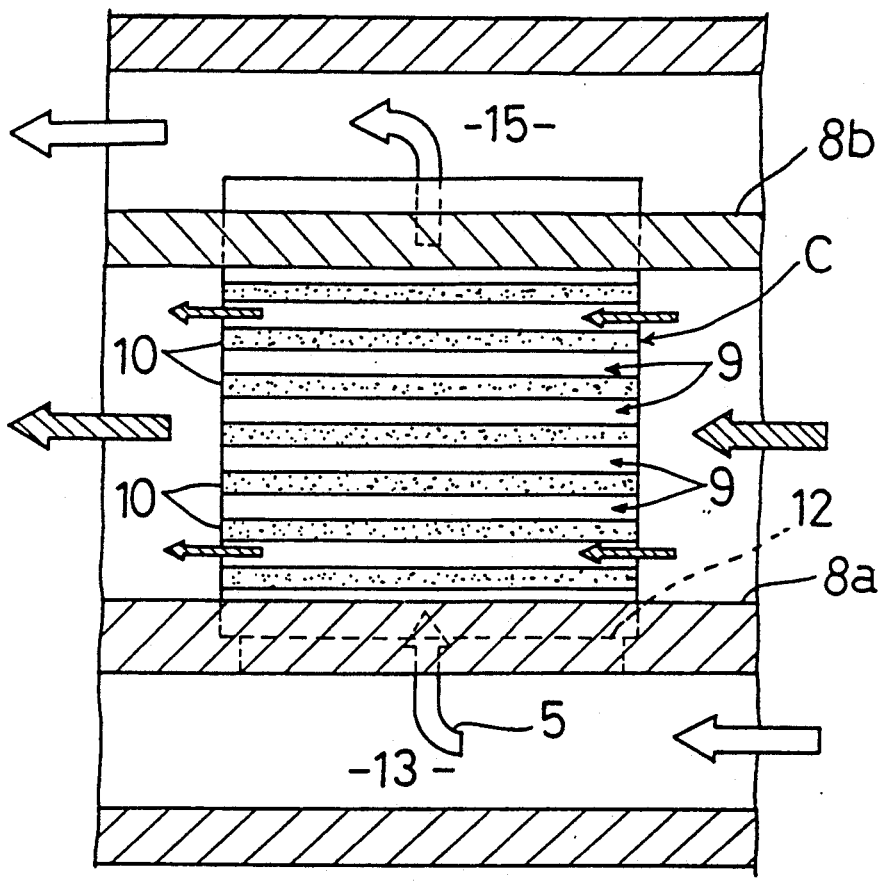
Figure 4:
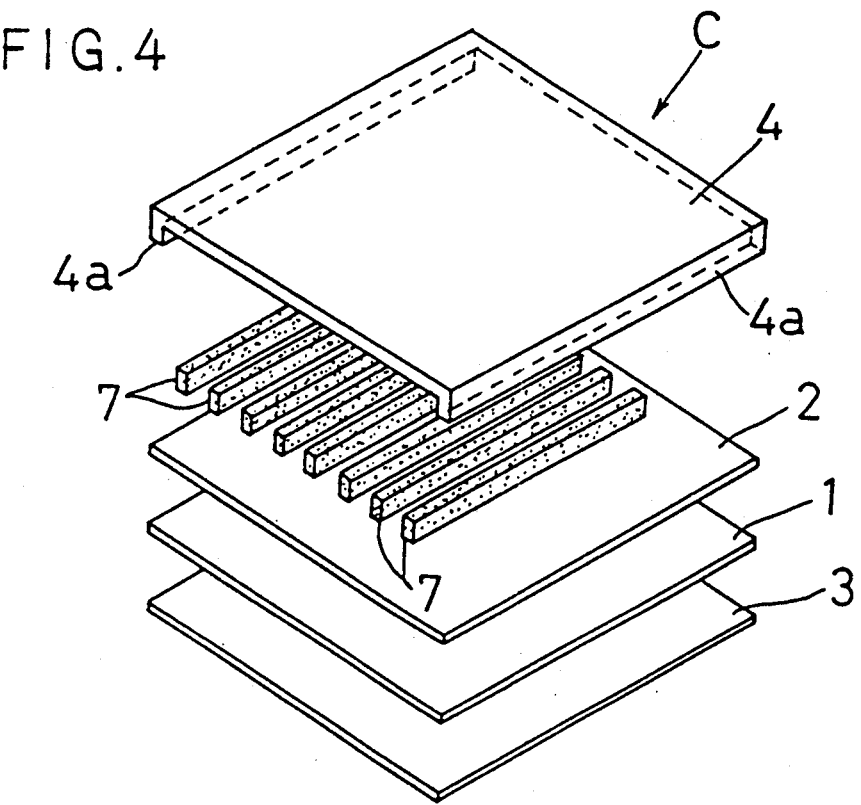
Figure 5:
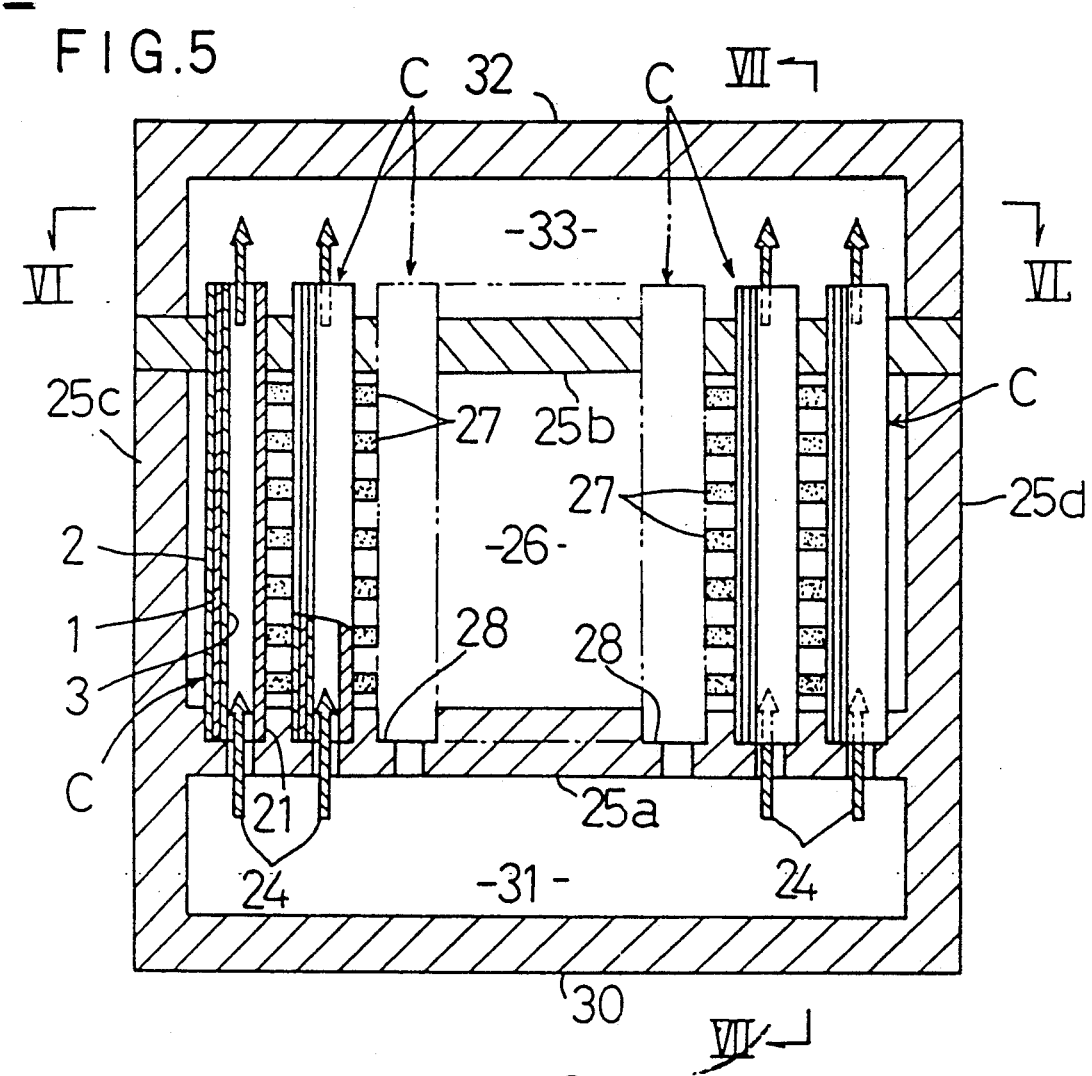
Figure 6:
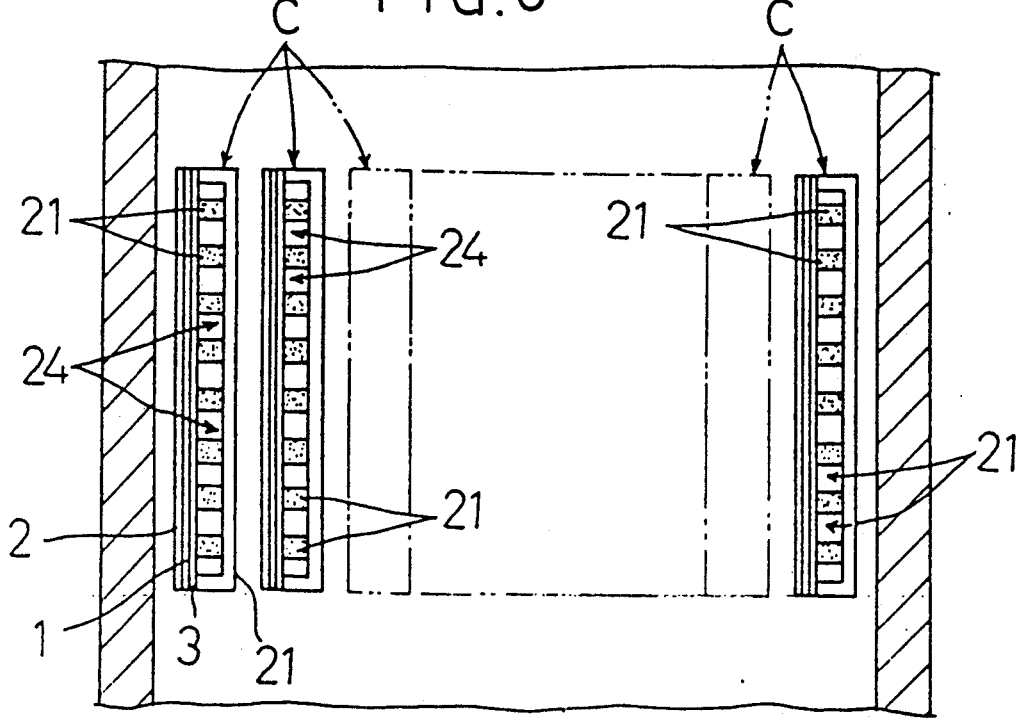
Figure 7:
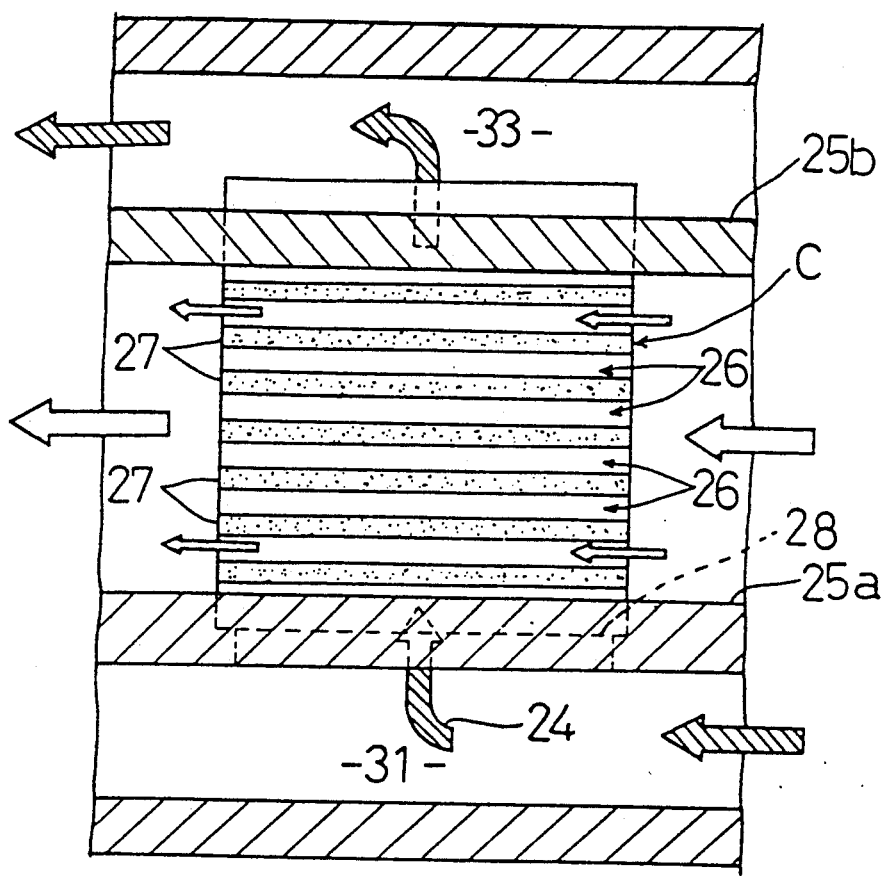
Figure 8:
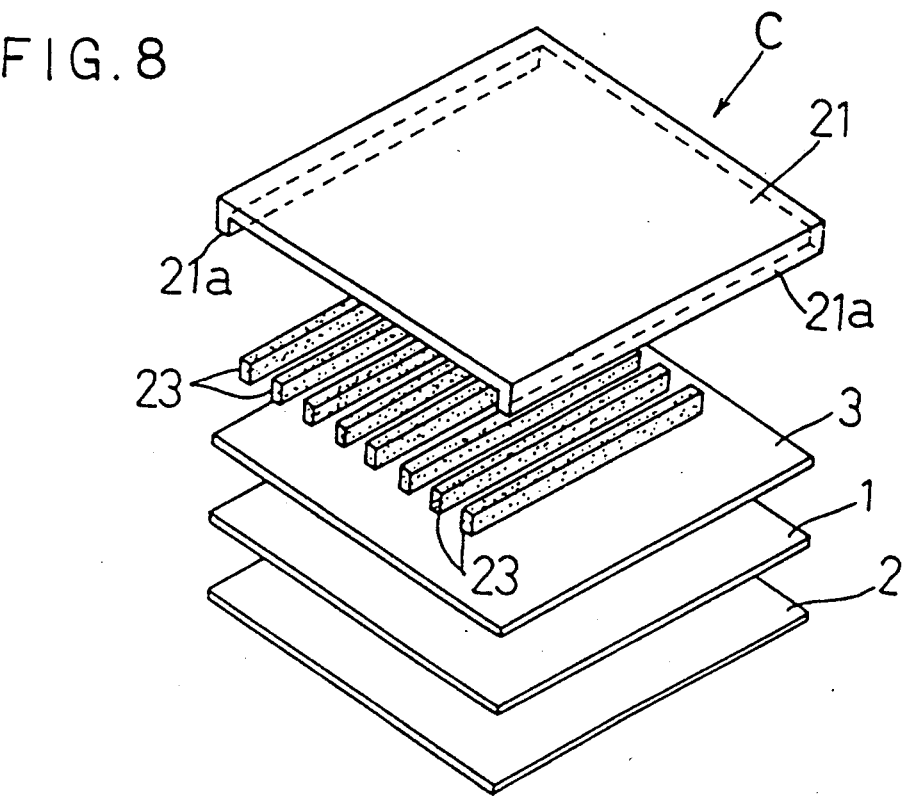

A first embodiment of the present invention will be described hereinafter with reference to FIGS. 1 through 4.

In a fuel cell assembly relating to this first embodiment, a cell C includes a rectangular-shaped plate-like solid electrolytic layer 1, a film or plate type oxygen electrode 2 attached entirely or substantially entirely on one face of the electrolytic layer 1, and a film or plate type fuel electrode 3 attached entirely or substantially entirely on the other face of the electrolytic layer 1, such that electricity is generated between the oxygen electrode 2 and the fuel electrode 3.

The solid electrolytic layer 1 is appropriately formed of e.g. $ZrO_2$ in the form of tetragonal system with solid solution of Yt (yttrium oxide, e.g. $Y_2O_3$) in the approximate order of 3 mol %. The oxygen electrode 2 is appropriately formed of e.g. $LaMnO_3$, and so on. The fuel electrode 3 is appropriately formed of cermet of Ni and $ZrO_2$, etc.

A conductive separator 4 having a pair of ridges 4a is attached only to the oxygen electrode 2, with the entire ridges 4 being affixed to the oxygen electrode 2. And, an oxygen-containing gas flow passage 5 is formed at a gap between the oxygen electrode 2 and the separator 4.

The separator 4 is appropriately formed of $LaCrO_3$ or the like having good anti-oxydation and anti-reduction properties.

In the oxygen-containing gas flow passage 5, a plurality of flexible conductive members 7 capable of absorbing thermal strain are equidistantly spaced in parallel and closely to the oxygen electrode 2 and the separator 4, such that an electricity passage having a large cross-sectional area may be formed between the oxygen electrode 2 and the separator 4 acting as a cell terminal. The conductive members 7 can be formed as a single flat plate instead of the plurality of band like members illustrated in the drawings. That is, the specific configuration of the conductive members 7 can vary depending on the convenience.

The conductive member 7 is appropriately formed of e.g. a felt-like member of LaMnO$_3$ having good heat resistance and oxidation resistance.

Inside a fuel flow passage 9 formed by partition walls 8a through 8d, a plurality of the cells C each having the above-described construction are vertically oriented and disposed side by side with each other. Further, between adjacent pairs of the cells C, there are equidistantly disposed a plurality of conductive spacers 10 for separating the fuel flow passage 9 into a plurality of sections. Accordingly, all the fuel electrodes 3 of the cells C are caused to face the fuel flow passage 9 and all the cells C are serially connected with each other through the conductive spacers 10. These conductive spacers 10, like the flexible conductive members, can be formed as a single flat plate, and the specific configuration of the same can be varied conveniently.

The partition walls 8a through 8d are formed of e.g. ceramics having electrical insulating property and heat insulating property.

The spacers 10 are appropriately formed of flexible material capable of absorbing thermal strain, such as felt material of Ni having good resistance against oxydation-reduction.

An inlet opening of each oxygen-containing gas flow passage 5 inside the cell C is communicated with an oxygen-containing gas feed passage 13 formed by the partition wall 8a and downwardly of the fuel flow passage 9. Also, an outlet opening of each oxygen-containing gas flow passage 5 is communicated with an exhaust passage 15 formed by the partition walls 8b and 14 and upwardly of the fuel flow passage 9.

With the fuel cell assembly of this embodiment in operation, the oxygen-containing gas flow passages 5 are fed with such oxygen-containing gas as air, oxygen-rich air or oxygen; whereas the fuel flow passage 9 is fed with any of various kinds of fuel as a hydrogen supply source. Then, by the effect of the electrolytic layer 1, electricity is generated and this generated electricity is collected by the plurality of cells C serially connected with each other.

Further, a lower end portion of the cell C is inserted into a recess 12 defined in the partition wall 8a sectioning between the fuel flow passage 9 and the oxygen-containing gas feed passage 13. On the other hand, an upper end portion of the cell C is insertible into and withdrawable from the partition wall 8b for sectioning between the fuel flow passage 9 and the exhaust passage 15.

That is to say, the gap between the cell C and the partition wall 8a is effectively sealed by means of the weight of the cell C per se which maintains sealed attachment between the cell C and the partition wall 8a. Accordingly, any mixture of the fuel and the oxygen-containing gas can be effectively avoided. At the same time, the above arrangement serves to absorb thermal strain of the cell C in the vertical direction, thereby to prevent breakage of the cell C and the partition walls 8a and 8b.

A second embodiment of the invention will be particularly described next with reference to FIGS. 5 through 8.

In this second embodiment, the cell C is constructed in the substantially same manner as described in the foregoing embodiment. Then, a separator 21, which is identical with the separator 4 of the first embodiment, and a conductive member 23, which is also identical with its counterpart in the first embodiment are attached only to the fuel electrode 3, and a fuel flow passage 24 is formed between the fuel electrode 3 and the separator 21.

Further, inside an oxygen-containing gas flow passage 26 formed by partition walls 25a through 25d, a plurality of the cells C are disposed with vertical orientation and side by side with each other. And, by means of spacers 27 which are similar to those in the first embodiment, the oxygen-containing gas flow passage 26 is divided into a plurality of sections each disposed between an adjacent pair of the cells C.

An inlet opening of each fuel flow passage 24 inside the cell C is communicated with a fuel feed passage 31 formed by the partition walls 25a and 30 and downwardly of the oxygen-containing gas flow passage 26. Also, an outlet opening of each fuel flow passage 24 is communicated with an exhaust passage 33 formed by the partition walls 25b and 32 and upwardly of the oxygen-containing gas flow passage 26.

A lower end portion of each cell C is inserted into a recess 28 defined in the partition wall 25a partitioning between the oxygen-containing gas flow passage 26 and the fuel feed passage 31. Also, an upper end portion of each cell C is insertible into and withdrawable from the partition wall 25b partitioning between the oxygen-containing gas flow passage 26 and the exhaust passage 33. As a result, the construction of this embodiment achieves similar effects as those achieved by the construction of the first embodiment.

Figure 9:
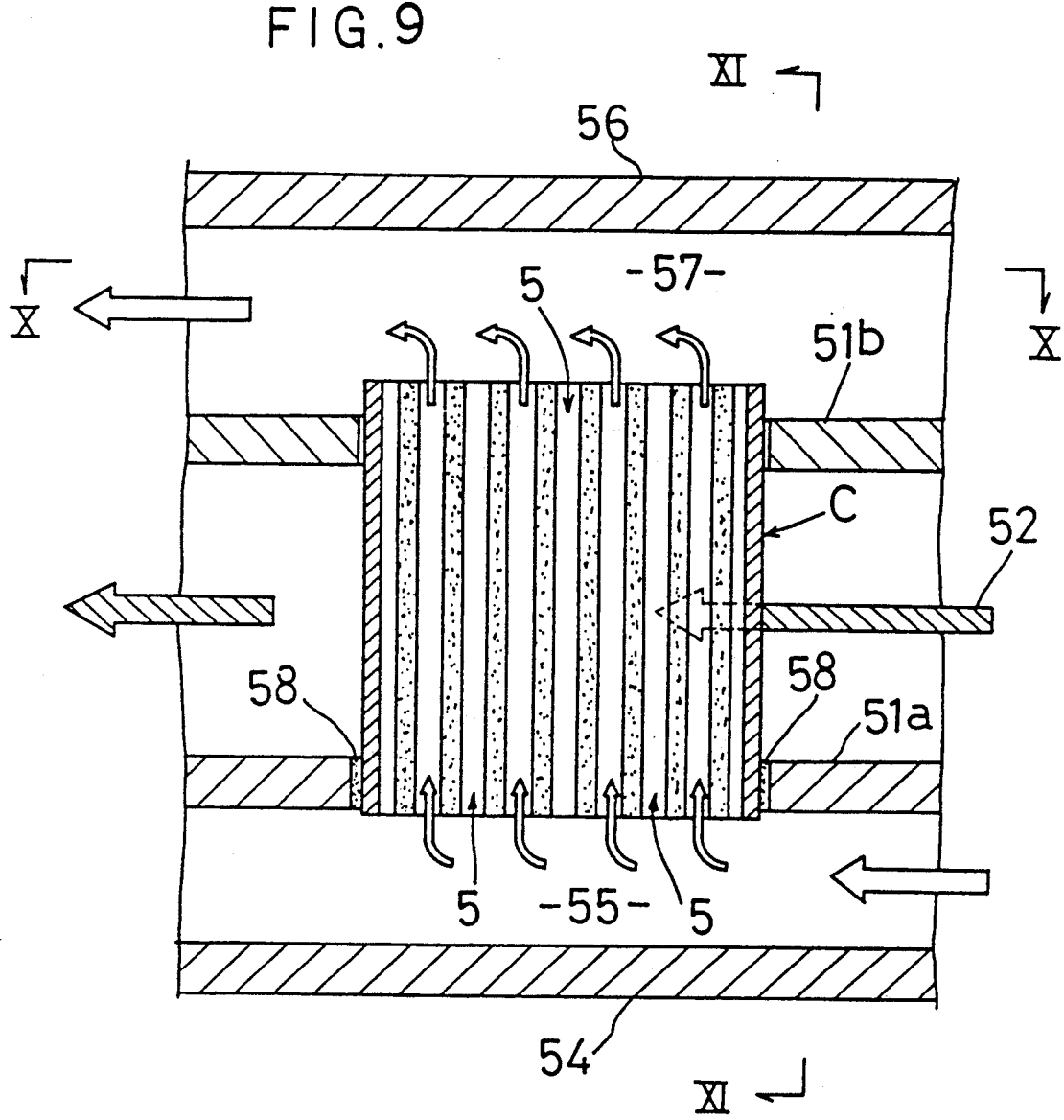
Figure 10:
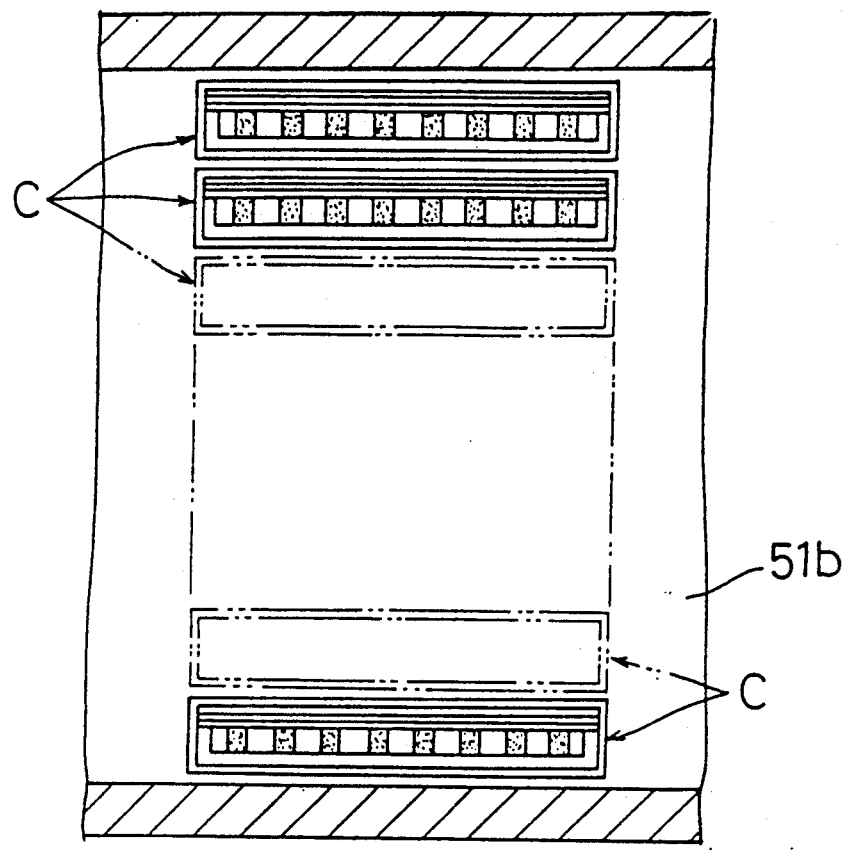
Figure 11:
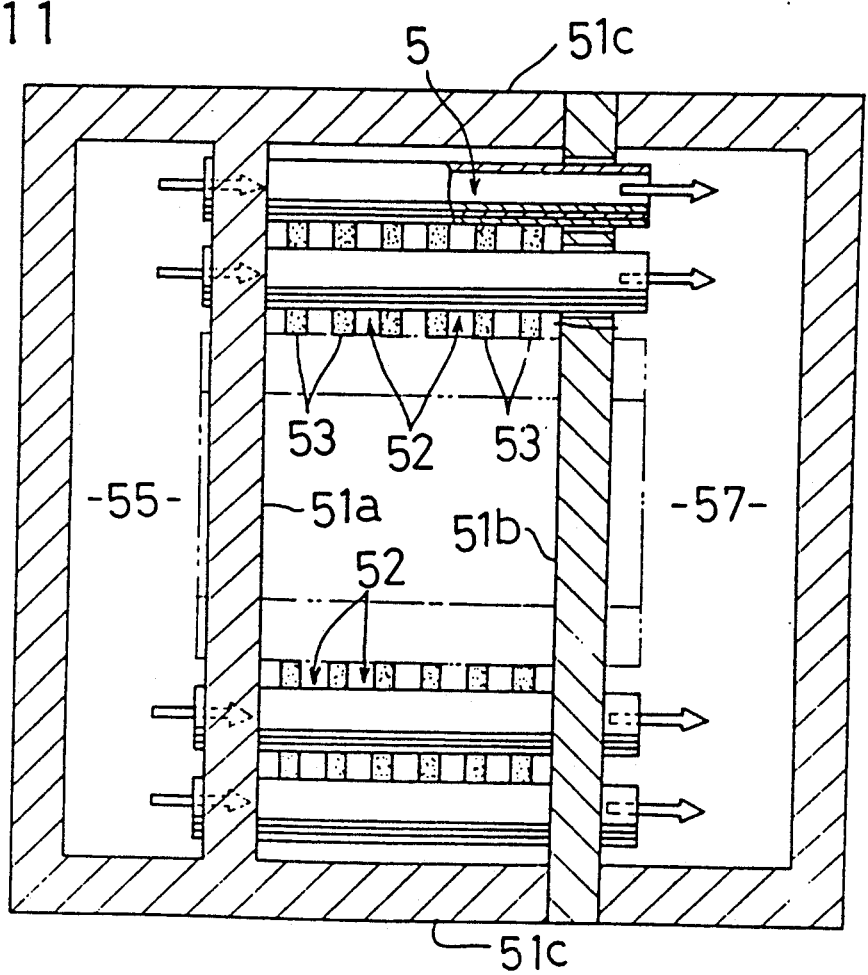

Next, a third embodiment of the present invention will be particularly described with reference to FIGS. 9 through 11.

Inside a fuel flow passage 52 formed by partition walls 51a through 51d, a plurality of cells C each having the same construction as the cell C of the first embodiment are disposed with lateral orientation and placed up and down with each other. And, by means of spacers 53 which are similar to those in the first embodiment, the fuel flow passage 52 is divided into a plurality of sections each disposed between an adjacent pair of the cells C.

An inlet opening of each oxygen-containing gas flow passage 5 inside the cell C is communicated with an oxygen-containing gas feed passage 55 formed by partition walls 51a and 54 and at one lateral side of the fuel flow passage 52. Also, an outlet opening of each oxygen-containing gas flow passage 5 is communicated with an exhaust passage 57 formed by partition walls 51b and 56 and at the other lateral side of the fuel flow passage 52.

An end portion of each cell C is airtightly connected with the partition wall 51a partitioning between the fuel flow passage 52 and the oxygen-containing gas feed passage 55 by means of a connecting member 58 made of such material as molten ceramics having heat resistance and electric insulating property. Also, the other end portion of each cell C is insertible into and withdrawable from the partition wall 51b partitioning between the fuel flow passage 52 and the exhaust passage 57.

That is to say, the connecting member 58 provides sealing effect against leakage at the gap between the fuel flow passage 52 and the oxygen-containing gas feed passage 55. Further, since the cell C has its only one end portion fixed, stress concentration attributable to thermal expansion of the cell C can be effectively restricted, whereby the cell C and the partition walls 51a and 51b can be advantageously protected against breakage.

Figure 12:
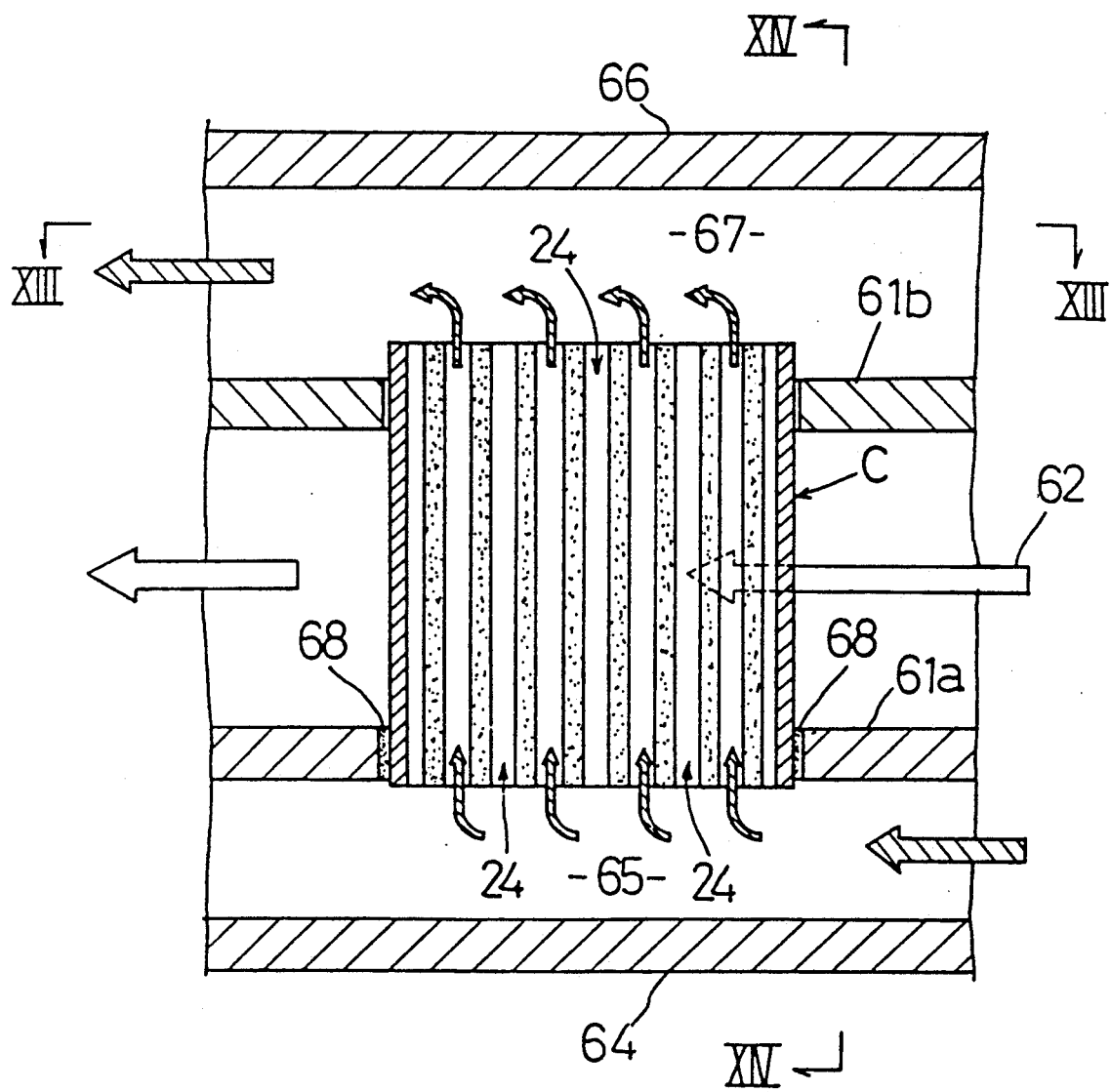
FIG. 12 is a section view.
Figure 13:
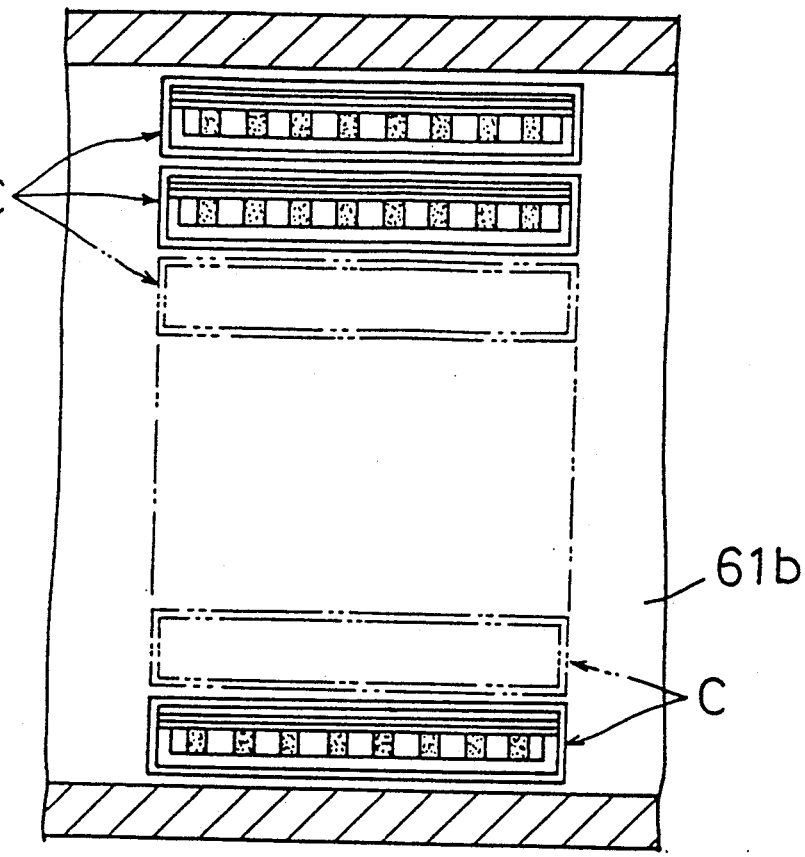
FIG. 13 is a partially sectional view taken along a line XIII—XIII of FIG. 12.
Figure 14:
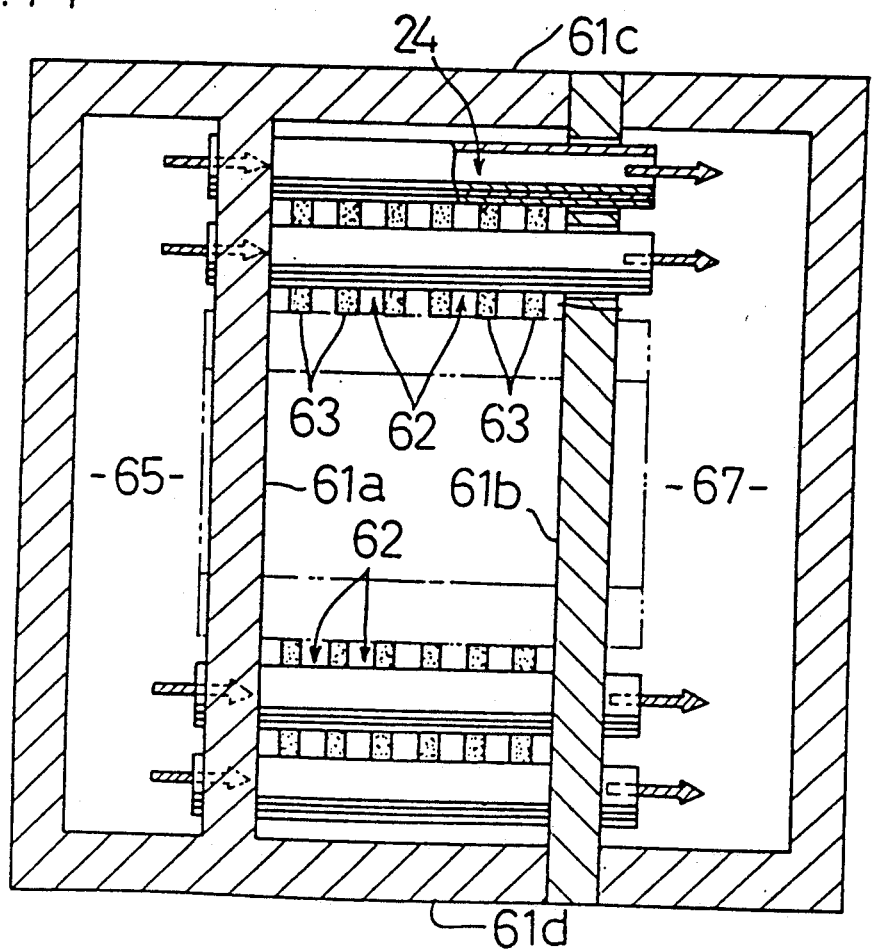
FIG. 14 is a partially sectional view taken along a line XIV—XIV of FIG. 12, and FIGS. 15 and 16 show major portions of further alternate embodiments of the present invention.

Next, a fourth embodiment of the present invention will be particularly described with reference to FIGS. 12 through 14.

Inside an oxygen-containing gas flow passage 62 formed by partition walls 61a through 61d, a plurality of cells C each having the same construction as the cell C of the second embodiment are disposed with lateral orientation and placed up and down with each other. And, by means of spacers 63 which are similar to those in the second embodiment, the oxygen-containing gas flow passage 62 is divided into a plurality of sections each disposed between an adjacent pair of the cells C.

An inlet opening of each fuel flow passage 24 inside the cell C is communicated with a fuel feed passage 65 formed by partition walls 61a and 64 and at one lateral side of the oxygen-containing gas flow passage 62. Also, an outlet opening of each fuel gas flow passage 24 is communicated with an exhaust passage 67 formed by partition walls 61b and 66 and at the other lateral side of the oxygen-containing gas flow passage 62.

An end portion of each cell C is airtightly connected with the partion wall 61a partitioning between the oxygen-containing gas flow passage 62 and the fuel feed passage 65 by means of a connecting member 68 made of such material as molten ceramics having heat resistance and electric insulating property. Also, the other end portion of each cell C is insertable into and withdrawable from the partition wall 61b partitioning between the oxygen-containing gas flow passage 62 and the exhaust passage 67. Thus constructed fuel cell assembly achieves the same effects as that of the third embodiment.

Some other alternate embodiments of the invention will be specifically described next.

The specific numbers of the oxygen-containing gas flow passages 5 formed between the oxygen electrodes 2 and the separators 4 and the conducting members 7 and 23 in the fuel flow passages 24 between the fuel electrodes 3 and the separators 21 can be conveniently varied. Further, these conducting members 7 and 23 can be eliminated at all.

The ridges 4a and 21a of the separators 4 and 21 can be affixed to the plate like solid electrolytic layers 1. Also, in these separators 4 and 21, the plate-like major portions and the ridges 4a and 21a can be formed separately from each other.

The spacers 10, 27, 53 and 63 disposed between the adjacent pairs of the cells C can be eliminated.

Figure 15:
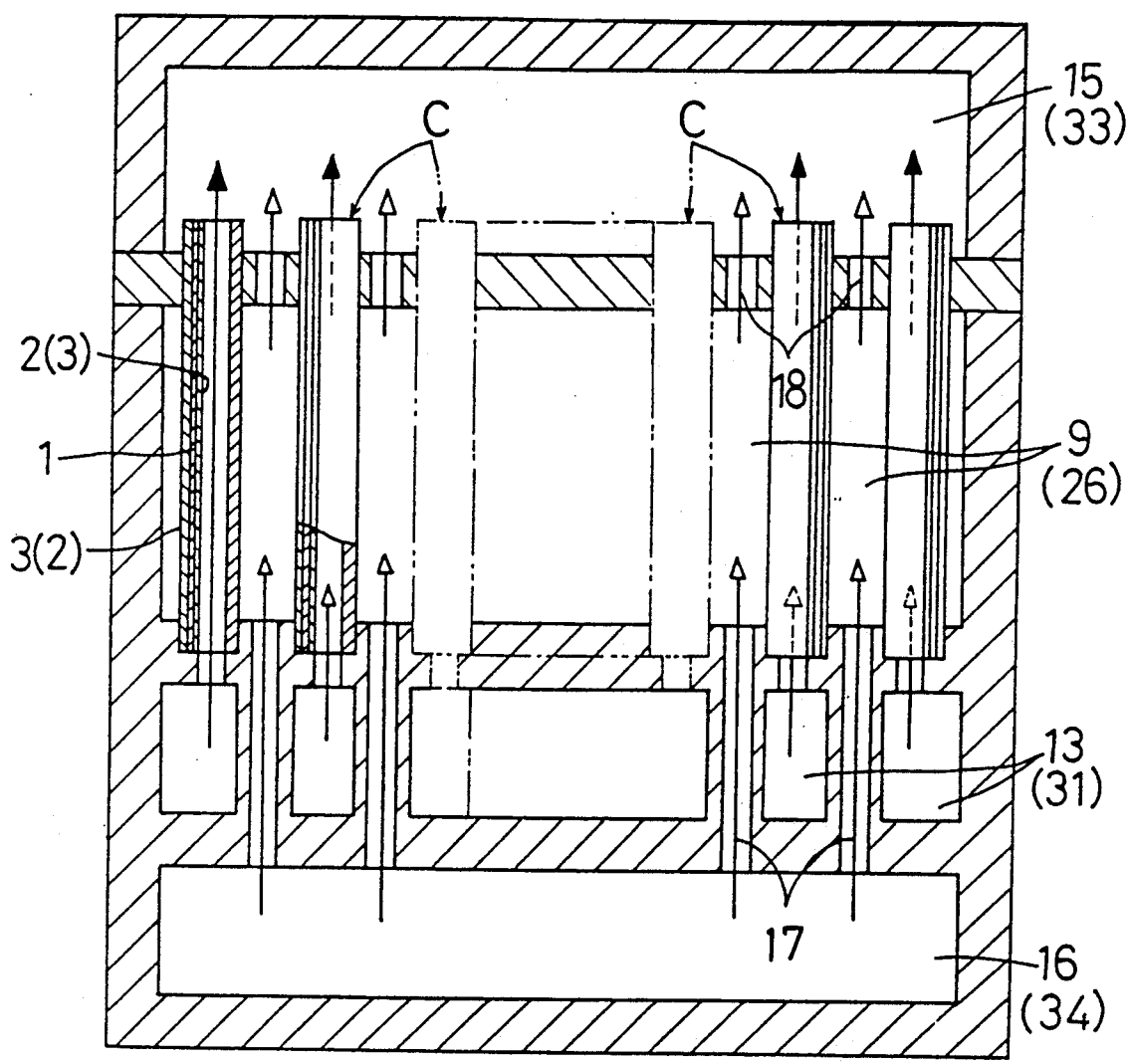

The flow passage design for feeding and exhausting the oxygen-containing gas and the fuel can be conveniently varied. In one such modified example illustrated in FIG. 15, the fuel flow passage 9 or the oxygen-containing gas flow passage 26 accommodating therein the cell C is connected with the fuel feed passage 16 or the oxygen-containing gas feed passage 34 via a distributing passage 17; whereas, the fuel flow passage 9 or the oxygen-containing gas flow passage 26 is connected with the exhaust passage 15 or 33 via a collecting passage 18.

Further, it is conceivable to arrange a plurality of units each including an aligned plurality of the cells C and to electrically connect these units serially or in parallel with each other.

Figure 16:
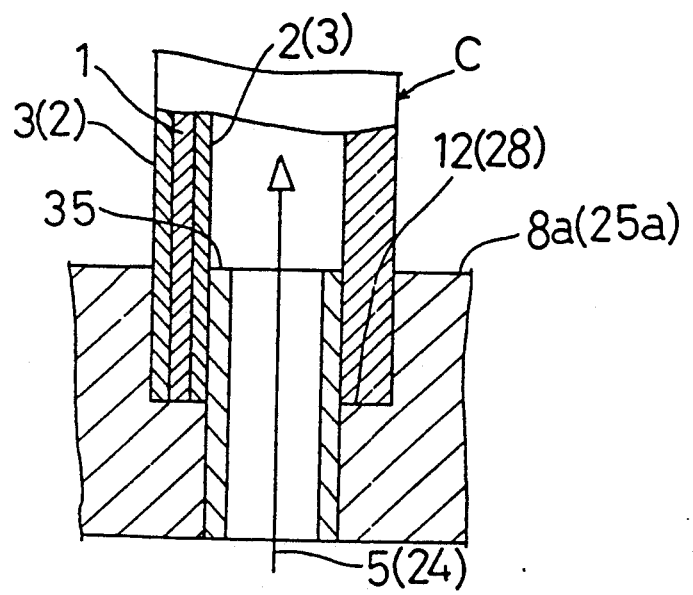
Figure 17:
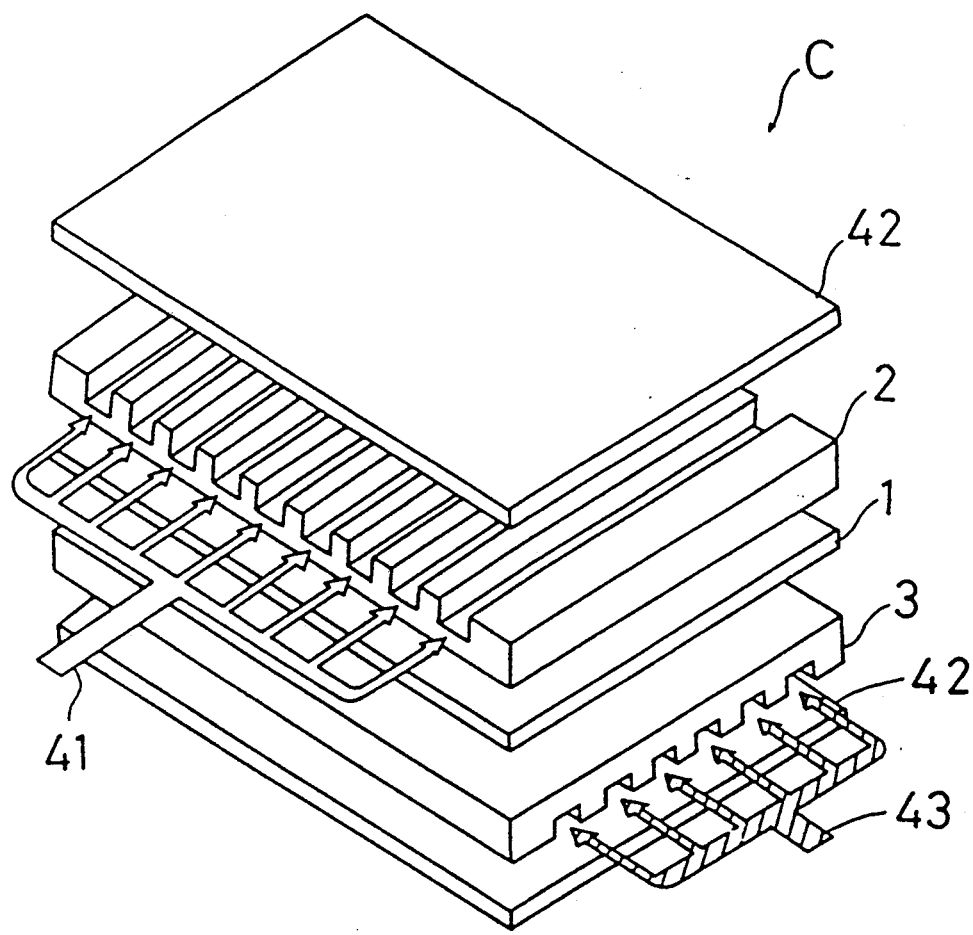
Figure 18:
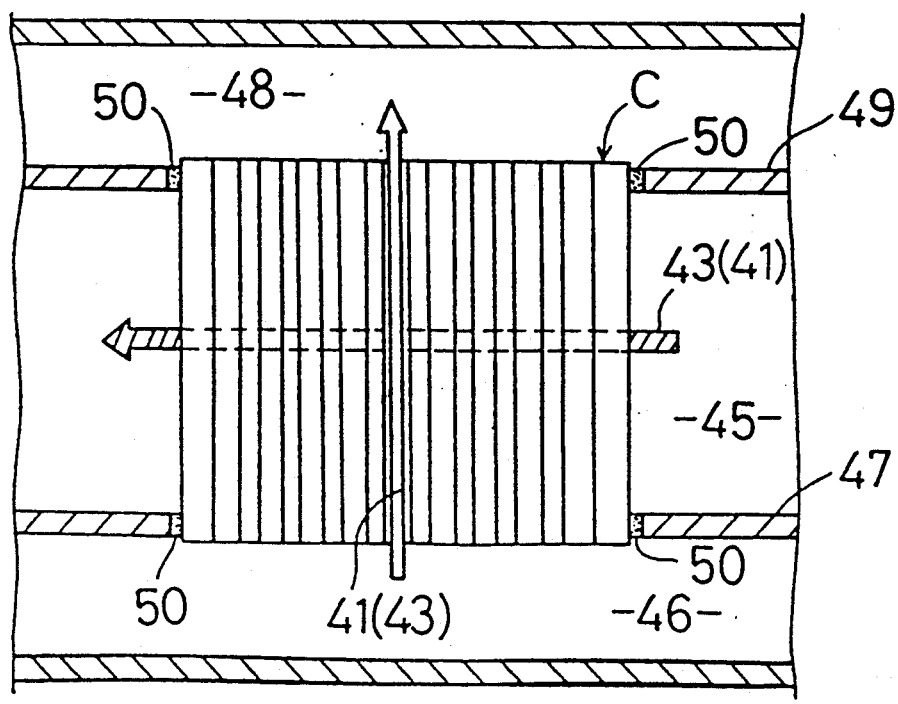

The specific means for forming the recesses 12 and 28 into which the lower end portions of the cells C are inserted can be varied conveniently. In one example illustrated in FIG. 16, the partition wall 8a or 25a includes a projection 35 engageable into the cell C for effectively sealing the gap between the wall 8a or 25a and the cell C. Moreover, it is also conceivable to provide filling material inside the recesses 12 and 28 for sealing the gaps between the cell C and the respective partition walls 8a and 25a.

It is further conceivable to interpose a flexible plate element between the partition wall 51a or 61a and the cell C for airtightly connecting between the same, such that flexible deformation of this plate element can effectively absorb the thermal expansion of the cell C. If such element which is freely deformable and generates almost no stress is employed for forming the airtight connecting portion, breakage of cell assembly due to thermal strain can be more effectively avoided.

What is claimed is:

1. A fuel cell assembly comprising:
    a cell consisting essentially of an electrolytic layer, an oxygen electrode attached to one side of the electrolytic layer and opposed to an oxygen-containing gas flow passage and of a fuel electrode attached to the other side of the electrolytic layer and opposed to a fuel flow passage;
    a separator attached only to the oxygen electrode and for forming therewith and therebetween the oxygen-containing gas flow passage;
    an oxygen-containing gas feed passage communicating with said oxygen-containing gas flow passage and disposed downwardly of said fuel flow passage; and
    an exhaust passage communicating with said oxygen-containing gas flow passage and disposed upwardly of said fuel flow passage;
    wherein said cell is disposed inside said fuel flow passage;
    a lower end portion of said cell being inserted into a recess defined in a partition wall sectioning between said fuel flow passage and said oxygen-containing gas feed passage; and
    an upper end portion of said cell being insertible into and withdrawable from a further partition wall sectioning between said fuel flow passage and said exhaust passage.

2. A fuel cell assembly as defined in claim 1, wherein said electrolytic layer is formed as a plate while said oxygen electrode and said fuel electrode are formed as a film or plate, respectively.

3. A fuel cell assembly as defined in claim 2, wherein said electrolytic layer is formed of $ZrO_2$ with solid solution of Yt.

4. A fuel cell assembly as defined in claim 2, wherein said oxygen electrode is formed of $LaMnO_3$.

5. A fuel cell assembly as defined in claim 2, wherein said fuel electrode is formed of cermet of Ni and $ZrO_2$.

6. A fuel cell assembly comprising:
    a cell consisting essentially of an electrolytic layer, an oxygen electrode attached to one side of the electrolytic layer and opposed to an oxygen-containing gas flow passage and of a fuel electrode attached to the other side of the electrolytic layer and opposed to a fuel flow passage;
    a separator attached only to the fuel electrode and for forming therewith and therebetween the fuel flow passage;
    a fuel feed passage communicating with said fuel flow passage and disposed downwardly of said oxygen-containing gas flow passage; and an exhaust passage communicating with said fuel flow passage and disposed upwardly of said oxygen-containing gas flow passage;

wherein said cell is disposed inside said oxygen-containing gas flow passage;

a lower end portion of said cell being inserted into a recess defined in a partition wall sectioning between said oxygen-containing gas flow passage and said fuel feed passage; and an upper end portion of said cell being insertible into and withdrawable from a further partition wall sectioning between said oxygen-containing gas flow passage and said exhaust passage.

7. A fuel cell assembly as defined in claim 6, wherein said electrolytic layer is formed as a plate while said oxygen electrode and said fuel electrode are formed as a film or plate, respectively.

8. A fuel cell assembly as defined in claim 7, wherein said electrolytic layer is formed of $ZrO_2$ with solid solution of Yt.

9. A fuel cell assembly as defined in claim 7, wherein said oxygen electrode is formed of $LaMnO_3$.

10. A fuel cell assembly as defined in claim 7, wherein said fuel electrode is formed of cermet of Ni and $ZrO_2$.

11. A fuel cell assembly comprises:

a cell consisting essentially of an electrolytic layer, an oxygen electrode attached to one side of the electrolytic layer and opposed to an oxygen-containing gas flow passage and of a fuel electrode attached to the other side of the electrolytic layer and opposed to a fuel flow passage;

a separator attached only to the oxygen electrode and for forming therewith and therebetween the oxygen-containing gas flow passage;

an oxygen-containing gas feed passage communicating with said oxygen-containing gas flow passage and disposed at one lateral side of said fuel flow passage; and an exhaust passage communicating with said oxygen-containing gas flow passage and disposed at the other lateral side of said fuel flow passage;

wherein said cell is disposed inside said fuel flow passage;

one side end of said cell being airtightly connected with a partition wall sectioning between said fuel flow passage and said exhaust passage; and the other side end of said cell being insertible into and withdrawable from a further partition wall sectioning between said fuel flow passage and said exhaust passage.

12. A fuel cell assembly as defined in claim 11, wherein said electrolytic layer is formed as a plate while said oxygen electrode and said fuel electrode are formed as a film or plate, respectively.

13. A fuel cell assembly as defined in claim 12, wherein said electrolytic layer is formed of $ZrO_2$ with solid solution of Yt.

14. A fuel cell assembly as defined in claim 12, wherein said oxygen electrode is formed of $LaMnO_3$.

15. A fuel cell assembly as defined in claim 12, wherein said fuel electrode is formed of cermet of Ni and $ZrO_2$.

16. A fuel cell assembly comprises:

a cell consisting essentially of an electrolytic layer, an oxygen electrode attached to one side of the electrolytic layer and opposed to an oxygen-containing gas flow passage and of a fuel electrode attached to the other side of the electrolytic layer and opposed to a fuel flow passage;

a separator attached only to the fuel electrode and for forming therewith and therebetween the fuel flow passage;

a fuel feed passage communicating with said fuel flow passage and disposed at one lateral side of said oxygen-containing gas flow passage; and an exhaust passage communicating with said fuel flow passage and disposed at the other lateral side of said oxygen-containing gas flow passage;

wherein said cell is disposed inside said oxygen-containing gas flow passage;

one side end of said cell being airtightly connected with a partition wall sectioning between said oxygen-containing gas flow passage and said fuel feed passage; and the other side end of said cell being insertible into and withdrawable from a further partition wall sectioning between said oxygen-containing gas flow passage and said exhaust passage.

17. A fuel cell assembly as defined in claim 16, wherein said electrolytic layer is formed as a plate while said oxygen electrode and said fuel electrode are formed as a film or plate, respectively.

18. A fuel cell assembly as defined in claim 17, wherein said electrolytic layer is formed of $ZrO_2$ with solid solution of Yt.

19. A fuel cell assembly as defined in claim 17, wherein said oxygen electrode is formed of $LaMnO_3$.

20. A fuel cell assembly as defined in claim 17, wherein said fuel electrode is formed of cermet of Ni and $ZrO_2$.

* * * * *